Patented Aug. 15, 1933

1,922,157

UNITED STATES PATENT OFFICE 1,922,157

METHOD AND MEANS FOR PREVENTING CANNIBALISM AMONG POULTRY

Lewis I. Fox, Metuchen, N. J., assignor to Irvin Kreielsheimer, Perth Amboy, N. J.

No Drawing. Application March 22, 1932
Serial No. 600,565

3 Claims. (Cl. 119—31)

Poultrymen have long experienced considerable losses due to cannibalism among young chicks. The tendency to cannibalism among young chicks is especially marked when the flocks are confined in brooder houses. The trouble is usually started by the taste of blood which results when one member of the flock becomes injured in some way, and the others pick at the wound until, in many cases the entire chick is devoured. Once the trouble begins the chicks quickly acquire the habit of picking at any part of a fellow chick disclosing the red color of a wound or blood, and after the habit of picking is developed even normal chicks will begin to attack one another with the result that injuries to the flock rapidly spread with consequent serious losses.

It is the object of this invention to provide a method and means for preventing the initiation of cannibalism in the brooder house, and the forestalling of the habit of picking among chicks confined therein.

I have observed that chicks quickly learn to pick at any part of a fellow chick showing a red color. This tendency seems to be inherent, and is stimulated and rapidly developed by sight of the red color. The tendency to cannibalism among chicks is further greatly increased in cases where the food ration given the flock lacks animal protein, but even in such cases the formation of the picking habit, I have found, is suppressed when the sight of red wounds, blood, etc., by the chicks is prevented.

My experiments have shown that if sighting of red wounds, blood, etc. upon chicks confined in brooder houses by other members of the flock be prevented, cannibalism does not develop, and picking, even though occurring occasionally, does not rise to the developed habit stage among the chicks. Attempts have been made to conceal red wounds, blood, etc. by smearing the parts of affected chicks with tar or special salves, but this method is neither satisfactory or effective, since it requires careful examination of the individual members of the flock, which is both difficult and uncertain by reason of the likelihood of affected chicks being overlooked, and, furthermore, even when efficiently accomplished tends to spoil the appearance of the broilers and thus lower their marketable value.

I have discovered, however, a highly efficient method of preventing sighting of red wounds, blood, etc. among the chicks in brooder houses which operates to eliminate cannibalism and picking habit formation. This method involves the application to the windows of the brooder house, through which light enters thereinto, of a transparent or translucent coating of substantially red color, the said coating being such as to permit the transmission therethrough of only those light rays having wave lengths lying within the limits of 650 to 750 millionths of a millimeter, the said transmitted rays serving to neutralize or block out the veins, blood and like spots of the chicks, so that such otherwise prominent markings are rendered invisible. This coating permits the passage of certain red light through the windows, thereby producing a red glow in the brooder house interior. Due to the predominating red color of the light within the brooder house, any wounds, blood spots or the like of red color occurring on the bodies of the chicks are neutralized so that the color thereof is not of such marked contrast as to attract attention of other confined chicks. The yellow legs and beaks of the chicks can be readily seen, but any red spots lose intensity of color and no longer appear in sharp contrast to the body of the chick, and consequently do not attract the sight of fellow chicks As a consequence, the chicks do not seem to notice the red colored spots, wounds or the like which may exist on the bodies of fellow chicks of the flocks, and therefore are not tempted to pick. Under such established conditions cannibalism is entirely eliminated, and the losses arising therefrom prevented.

I have found the most satisfactory way of producing the red coating on the brooder house windows and light admitting openings, is to apply to the glass thereof a coating comprising a preferably transparent, but at least translucent, lacquer containing a suitable drier and red dye or pigment. This coating is brushed on the surface of the glass so as to thoroughly cover the same, whereby the light transmitted therethrough is of desired red color. Such transparent lacquer permits the passage of a maximum amount of light, and yet assures the desired modification of the light to the necessary red color. The lacquer can be used on ordinary window glass, cel-o-glass, glass cloth or any other transparent medium used in the glazing of brooder house windows. It will be obvious that equivalent red coating materials may be employed, as e. g. the window glazing may be covered with a coating comprising red cellophane paper or similar transparent material of red color.

By the above method and means not only is cannibalism among chicks in brooder houses effectively eliminated, but feather pulling is also checked, so that production of so-called "bareback" and other messy looking broilers is likewise avoided.

Having thus described my invention, I claim:

1. The method of preventing cannibalism among chicks, comprising, confining the chicks, and while confined, subjecting them to sun light, so modified that only light rays having wave lengths lying within the range of 650 to 750 millionths of a millimeter reach the chicks, the said rays serving to neutralize the red of wounds, blood and like spots.

2. The method of preventing cannibalism among chicks, comprising confining the chicks, and while confined, subjecting them to light rays of sufficient intensity and of such wave lengths as to neutralize the red of wounds, blood and like spots.

3. The method of preventing cannibalism among chicks, comprising confining the chicks, and while confined, subjecting them to light rays of such wave lengths as will neutralize the red of wounds, blood and like spots.

LEWIS I. FOX.